United States Patent
Randall

(10) Patent No.: US 6,819,226 B2
(45) Date of Patent: Nov. 16, 2004

(54) SYSTEMS AND METHODS FOR ENERGY STORAGE IN LAND-BASED TELEMETRY APPLICATIONS

(75) Inventor: Bruce E. Randall, Rock Hill, SC (US)

(73) Assignee: SmartSynch, Incorporated, Jackson, MS (US)

( * ) Notice: Subject to any disclaimer, the term of this patent is extended or adjusted under 35 U.S.C. 154(b) by 71 days.

(21) Appl. No.: 10/411,060

(22) Filed: Apr. 9, 2003

(65) Prior Publication Data

US 2003/0222505 A1 Dec. 4, 2003

Related U.S. Application Data

(60) Provisional application No. 60/383,843, filed on May 28, 2002.

(51) Int. Cl.$^7$ .............................. G08B 1/00; G08B 23/00
(52) U.S. Cl. .................. 340/333; 340/693.4; 340/7.32; 455/574; 455/127.1; 455/127.5; 363/19; 320/153; 307/64; 307/66; 136/208; 330/297; 330/130; 330/199
(58) Field of Search ........................... 340/693.1, 693.2, 340/693.3, 693.4, 333, 7.32, 7.37; 455/572, 573, 574, 127.1, 127.2, 127.5; 307/23, 24, 64, 66, 149; 320/153; 330/289, 297, 123, 127, 130, 199; 363/19, 28; 136/200, 208

(56) References Cited

U.S. PATENT DOCUMENTS

| | | | |
|---|---|---|---|
| 5,251,179 A | * 10/1993 | Wittman | 365/227 |
| 5,446,453 A | 8/1995 | Nagamoto et al. | 340/825.2 |
| 5,745,532 A | 4/1998 | Campana, Jr. | 375/347 |
| 5,748,104 A | 5/1998 | Argyroudis et al. | 340/870.11 |
| 5,757,172 A | * 5/1998 | Hunsdorf et al. | 323/277 |
| 5,883,886 A | 3/1999 | Eaton et al. | 370/314 |
| 5,969,436 A | * 10/1999 | Chalasani et al. | 307/64 |
| 6,208,266 B1 | 3/2001 | Lyons et al. | 340/870.02 |
| 6,246,677 B1 | 6/2001 | Nap et al. | 370/346 |
| 6,272,190 B1 | 8/2001 | Campana, Jr. | 375/347 |
| 6,388,628 B1 | 5/2002 | Dettloff et al. | 343/742 |
| 6,437,692 B1 | 8/2002 | Petite et al. | 340/3.1 |
| 6,459,175 B1 | * 10/2002 | Potega | 307/149 |
| 6,480,699 B1 | 11/2002 | Lovoi | 455/41.2 |
| 6,538,577 B1 | 3/2003 | Ehrke et al. | 340/637 |
| 2002/0014880 A1 | * 2/2002 | McAndrews | 320/134 |
| 2002/0072868 A1 | 6/2002 | Bartone et al. | 702/62 |
| 2002/0082748 A1 | 6/2002 | Enga et al. | 700/291 |
| 2002/0084940 A1 | 7/2002 | Dettloff et al. | 343/742 |
| 2002/0109607 A1 | 8/2002 | Cumeralto et al. | 340/870.02 |
| 2002/0145537 A1 | 10/2002 | Mueller et al. | 340/870.02 |
| 2002/0161536 A1 | 10/2002 | Suh et al. | 702/62 |
| 2002/0193144 A1 | 12/2002 | Belski et al. | 455/557 |
| 2003/0034900 A1 | 2/2003 | Han | 340/870.02 |
| 2003/0036810 A1 | 2/2003 | Petite | 700/9 |
| 2003/0036822 A1 | 2/2003 | Davis et al. | 700/22 |
| 2003/0048199 A1 | 3/2003 | Zigdon et al. | 340/7.1 |
| 2003/0063723 A1 | 4/2003 | Booth et al. | 379/106.03 |
| 2003/0085621 A1 | 5/2003 | Potega | 307/18 |
| 2003/0087615 A1 | 5/2003 | Randall | 455/127.1 |
| 2003/0122686 A1 | 7/2003 | Ehrke et al. | 340/870.02 |

* cited by examiner

*Primary Examiner*—Donnie L. Crosland
(74) *Attorney, Agent, or Firm*—Alston & Bird LLP

(57) ABSTRACT

The invention involves systems and methods of providing energy to land-based telemetry devices wherein the energy storage and power conditioning system is comprised of an input power supply, an energy storage element, an output supply and a control system. The input power supply provides energy to the output power supply and charges the energy storage element. The energy storage element is comprised of one or more UltraCaps and supplies energy to the output power supply at times of peak need and when the primary energy source to the input power supply is removed. The control system adjusts the voltage supplied to the energy storage element by the input power supply according to changes in the ambient temperature to compensate for changes in the internal equivalent series resistance of the UltraCaps caused by the change in ambient temperature. The output power supply provides energy to the land-based telemetry device. Adjusting the voltage supplied to the energy storage element helps extend the operating life of the UltraCaps.

18 Claims, 14 Drawing Sheets

SYSTEMS AND METHODS FOR ENERGY STORAGE IN LAND-BASED TELEMETRY APPLICATIONS

CROSS-REFERENCE TO RELATED APPLICATIONS

This application claims the benefit of U.S. Provisional Application No. 60/383,843, filed May 28, 2002.

BACKGROUND OF THE INVENTION

1. Field of the Invention

This invention relates generally to the field of data telemetry; and specifically to a system of method for storing energy for later use in electronic devices used in land-based telemetry.

2. Description of Related Art

Electronic metering and telemetry devices must accurately measure the flow or use of services, products or materials to external customers or internal processes. In addition to accurately measuring ("metering") such quantities, the telemetry device must be able to transmit the measured quantity and other information to another device with a low margin of error in such transmission or receive information transmitted by another device. Often such transmission or receipt must occur when the telemetry device has lost its primary power source. Therefore, most electronic telemetry devices have a back-up power source and are designed with several common characteristics in mind, including: operating reliably and accurately over a wide temperature range; continuing to function for a limited time after the failure of the primary power source; operating continuously, reliably and without maintenance in excess of ten years; and being physically small enough for the desired application. Additionally, the telemetry device may consume peak power exceeding the instantaneous capability of the primary power source when the primary source is available or "on" and any back-up power source must be designed to supply this additional energy.

Although implementing each of these requirements separately poses some difficulty, it is extremely difficult to address all five simultaneously. The practical energy storage devices for these applications are batteries, electrolytic capacitors, and a class of capacitors commonly referred to as "Super" capacitors or "SuperCaps." Generally, SuperCaps are capacitors with very high storage capacitance (e.g., on the order of one Farad, or higher). A drawback to SuperCaps is their very high "equivalent series resistance" or "ESR." Recently, SuperCaps have been developed with intrinsically low ESR (e.g., on the order of less than one-half ohm DC resistance). These SuperCaps with low ESR are commonly referred to as "UltraCaps." UltraCaps are commercially available from companies such as Cooper Electronic Technologies, a division of Cooper Industries, Ltd. (a Bermuda corporation, headquartered in Houston, Tex.) and Maxwell Technologies of San Diego, Calif.

Batteries are generally not a practicable solution to meet the above criteria because of their need for maintenance, their reduced life and because their operational characteristics are affected by temperature variations. SuperCaps (and to a lesser degree, UltraCaps), fail to operate consistently over wide variations in temperature. Furthermore, electrolytic capacitors are often large and bulky and rapidly discharge after a primary source power outage because of large leakage currents at high temperatures.

Because the life of batteries that are appropriate for these applications falls short of ten years and standard electrolytic capacitors are physically too large, it is more probable that the temperature performance of UltraCaps may be enhanced in some manner. Enhancing the performance of UltraCaps over a range of temperatures requires understanding the mechanisms that affect UltraCaps at temperature extremes: at low temperatures, the internal ESR of the capacitor increases notably, thereby decreasing the available energy at higher currents; and standard charging voltages at elevated operating temperatures may damage the internal materials of an UltraCap.

One way to address these issues is to operate the UltraCaps at a lower voltage at higher temperatures and to apply heat to the UltraCaps at low temperatures. This solution is problematic in that heating the UltraCaps requires additional energy that may not be available and operating the UltraCaps at a lower voltage requires an increase in the size or number of UltraCaps, in conflict with the need to keep the energy source small. Therefore, what is needed is an electronic metering and telemetry device and associated back-up power supply that simultaneously operates reliably and accurately over a wide temperature range; continues to function for a limited time after the failure of the primary power source; operates continuously, reliably and without maintenance in excess of ten years; is physically small enough for the desired application; and with a back-up power source capable of supplying additional energy when the telemetry device consumes peak power exceeding the instantaneous capability of the primary power source when the primary source is available or "on." This invention demonstrates a method and system of meeting all of the design criteria using UltraCaps, while considering all of the device's shortcomings.

BRIEF SUMMARY OF THE INVENTION

The invention is a system and method for using a class of capacitors known as "UltraCaps" to provide energy storage in electronic devices. In particular, the invention provides energy storage for land-based telemetry devices. Specifically, the invention measures ambient air temperature and changes the voltage applied to one or more UltraCaps connected in series based on the measured ambient temperature.

The invention involves two power supplies, an input power supply and an output power supply, and one or more UltraCaps. The input power supply receives power from a primary power source, supplies charging voltage to the UltraCaps, and supplies power to the output power supply. The output power supply receives power from the input power supply and/or the UltraCaps and provides a constant voltage output for use by the telemetry device for its operation.

One or more of a microprocessor, microcomputer, microcontroller, control circuit or other external means controls the power supplies. The external control system may be associated with an associated metering device or the telemetry device. One or more algorithms controls the input power supply such that a lower voltage is applied to the UltraCaps at higher temperatures to prevent damaging the UltraCaps and a higher voltage is applied at low temperatures to compensate for internal energy dissipation caused by higher ESR. At lower temperatures the higher voltages do not damage the UltraCaps and in no case does the applied voltage exceed the manufacturer's ratings for the UltraCap.

In the event of a failure to the primary power source, the input power supply shuts down and power is furnished to the output power supply by one or more UltraCaps. The output power supply, in turn, provides power to the telemetry devices for a limited amount of time to enable the device to continue to receive and transmit information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1A:
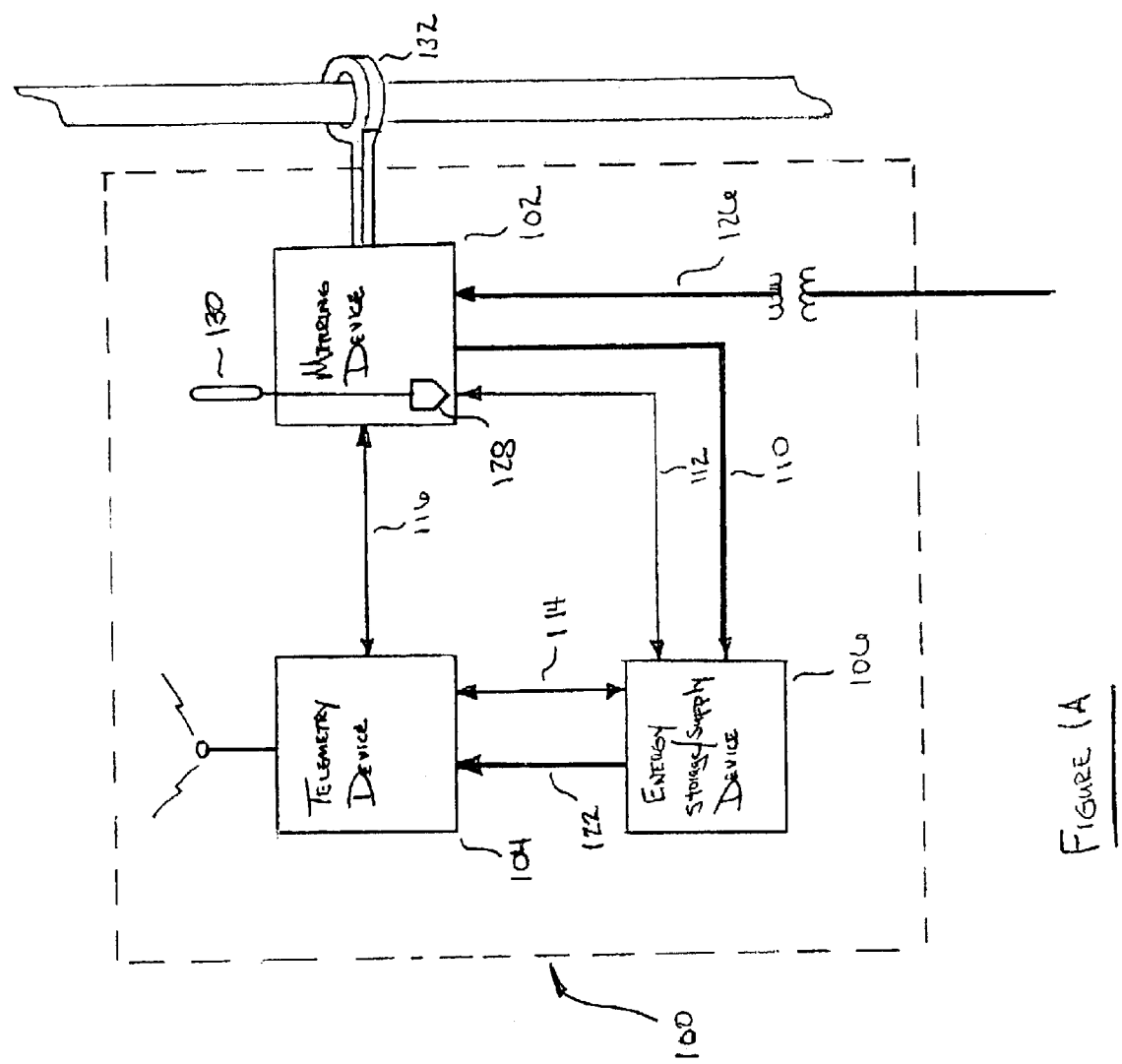
FIG. 1A is a simple exemplary block diagram of an energy storage and power condition system for metering and telemetry devices in an embodiment of the invention.

FIG. 1A is a simplified exemplary overview of an apparatus 100 encompassing an embodiment of the invention in which a metering device 102 measures a quantity of a service, product or material by use of a sensor, transducer, optical reader, transformer, etc. 132 and provides the metered quantity to a telemetry device 104. For example, the metering device 102 may measure the flow of electrical energy into a building or the flow of electrical energy into or out of an electrical generating facility, the flow of water, natural gas, propane, etc. into an area where such products are being used. Furthermore, the metering device 102 may be used to measure the quantity of a material or substance that is added during a manufacturing process. An energy storage/supply device 106 is connected to and supplies energy to the telemetry device 104. Generally, a primary source of energy 110 is supplied to the energy storage/supply device 106 from, for example, the metering device 102. An outside source 126 supplies energy to the metering device 102. In other embodiments, the outside source 126 may connect directly to the energy storage/supply device 106 or it may connect to the telemetry device 104 with a subsequent feed to the energy storage/supply device 106. Control and input signals 112 are transmitted to and from the metering device 102 and the energy storage/supply device 106. Energy is supplied to the telemetry device 104 from the energy storage/supply device 106. The energy storage/supply device 106 will continue to supply energy to the telemetry device 104 for a limited time after the failure of the primary source of energy 110. Control and input signals 114 are transmitted to and from the telemetry device 104 and the energy storage/supply device 106. Furthermore, control and input signals 116, including the metered quantity, are transmitted to and from the metering device 102 and the telemetry device 104.

Figure 1B:
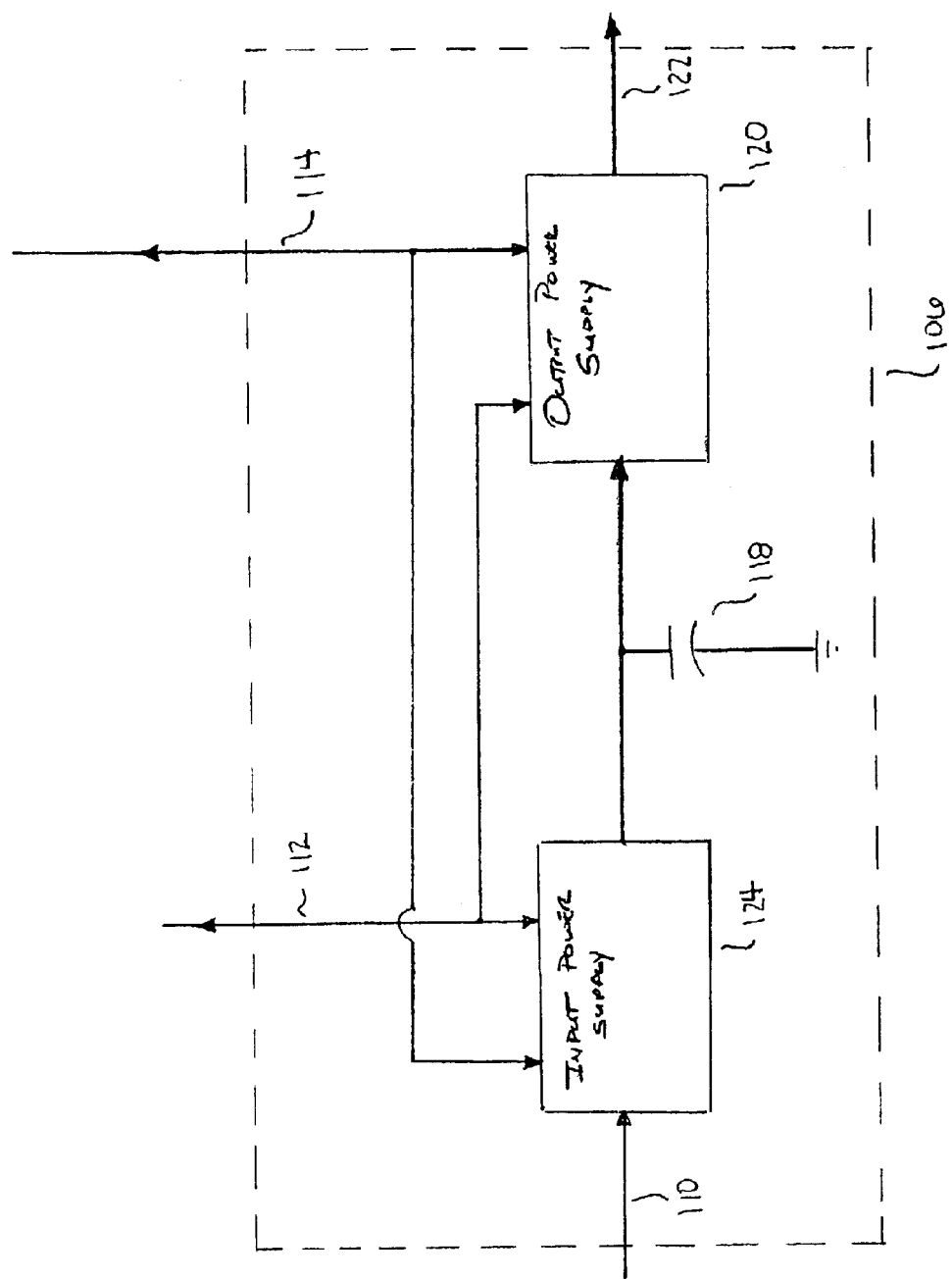
FIG. 1B is a more detailed exemplary block diagram of an energy storage and power conditioning system for an application in an embodiment of the invention.

Either the telemetry device 104 or the metering device 102, or both may have a microcomputer, microprocessor, microcontroller or control circuit (128) for the control of the energy storage/supply device 106 (the control device 128 is shown in this embodiment as being included within the metering device 102). The metering device may also include a temperature sensor 130 that is used by the control device 128 to adjust the output voltage of the energy storage/supply device 106, according to the ambient temperature. In other embodiments, circuits or devices not associated with the telemetry device 104 or the metering device may control the energy storage/supply device 106. As shown in FIG. 1B, the energy storage/supply device 106 is comprised of an input power supply 124, one or more energy storage capacitors 118, and an output power supply 120.

In a preferred embodiment, the input power supply 124 is a switching voltage regulator such as a switched-mode power supply with a regulated output as is known in the art such as, for example, a Linear Technology LT1618, although other models or types of power supplies may be used. The input power supply 124 serves as a charger for the energy storage capacitors 118, and is a constant voltage/constant current type charger. It also provides energy to the output power supply 120 when the primary source of energy 110 is supplying energy to the input power supply 124.

The output power supply 120 may also be a switching voltage regulator, such as, for example, a National Semiconductor LM 2650 buck-type switching regulator, although other models and types of power supplies may be used. This device takes the varying voltage from the energy storage capacitors 118 and/or the input power supply 124 and produces a fixed voltage for use by the application.

The energy storage capacitors 118 are a form of capacitor generally known as UltraCaps characterized by a low ESR that allows high discharge currents.

Figure 2:
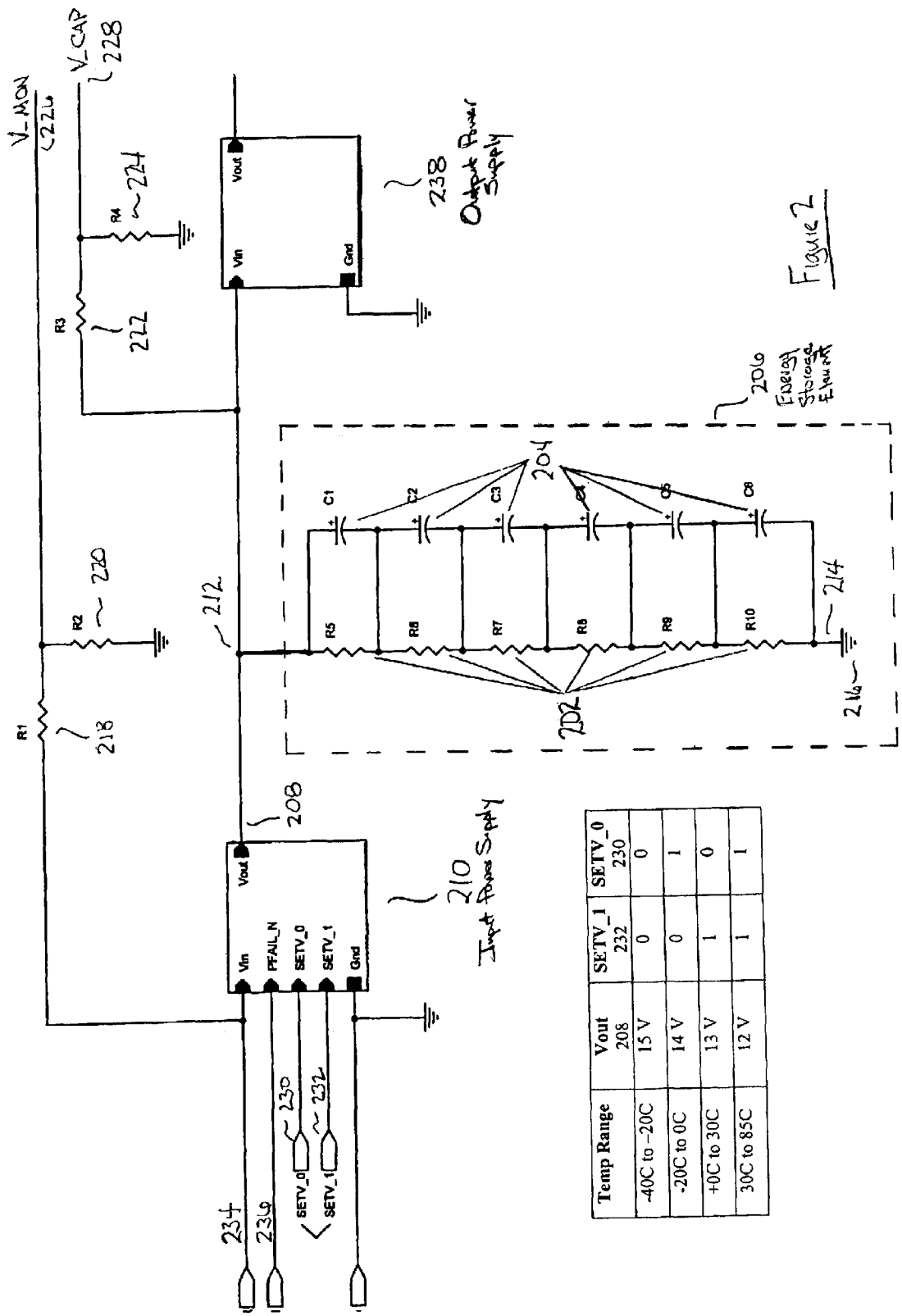
FIG. 2 is an exemplary circuit diagram of an energy storage and power conditioning system for an application in an embodiment of the invention.

The preferred embodiment of the invention includes one or more UltraCaps 118 connected in series to form an energy storage element. If a particular embodiment requires more than one UltraCap, then each UltraCap should have a resistor in parallel as shown in FIG. 2. The resistors 202 in parallel to the UltraCaps 204 provides an even voltage distribution across each UltraCap 204 in a multi-capacitor arrangement although such a resistor is not required to practice the invention. Each resistor 202 in parallel to an UltraCap 204 should be of substantially equivalent resistance value so that the voltage will be divided equally across the capacitors 204. Furthermore, in a multi-capacitor arrangement as shown in FIG. 2, the values (capacitance, voltage rating, etc.) of the capacitors (UltraCaps) 204 connected in series should be substantially equivalent for proper voltage distribution.

The energy storage element 206 in an exemplary embodiment of the invention as shown in FIG. 2 is comprised of UltraCaps C1, C2, C3, C4, C5 and C6 204 and each capacitor's paralleled resistor, R5, R6, R7, R8, R9, and R10 202, respectively. In a preferred embodiment such as that shown in FIG. 2, each of the capacitors 204 will be substantially equivalent in their rating values such as, for example, 10 Farads and 2.5 VDC, although capacitors of other values may be used. Resistors R5–R10 202 will also be of substantially equivalent value such as, for example 10K ohms at 1% accuracy, although other values may be used. Resistors R1 218 and R2 220 form a voltage divider such as, for example, a 10:1 voltage divider, to allow an analog to digital converter ("ADC") (not shown) to read the input power source's 234 bus voltage 226. The digital bus voltage signal is then provided by the ADC to a microcomputer, microprocessor, controller or circuit 128 associated with the application in order to control the energy storage system 106. Resistors R3 222 and R4 224 form a voltage divider such as, for example, a 10:1 voltage divider, to allow an ADC (not shown) to read the bus voltage 228 at the energy storage element 206. The digital bus voltage signal of the energy storage element 206 is then provided by the ADC to a microcomputer, microprocessor, controller or circuit 128 associated with the application in order to control the energy storage system. In some embodiments, the invention may be practiced without the voltage dividers formed by R1 218, R2 220 and R3 222, R4 224.

The output 208 of the input power supply 210 is connected to the positive terminal 212 of the energy storage element 206, and the negative terminal 214 of the energy storage element 206 is connected to the circuit ground 216, as is shown in FIG. 2.

Figure 3:
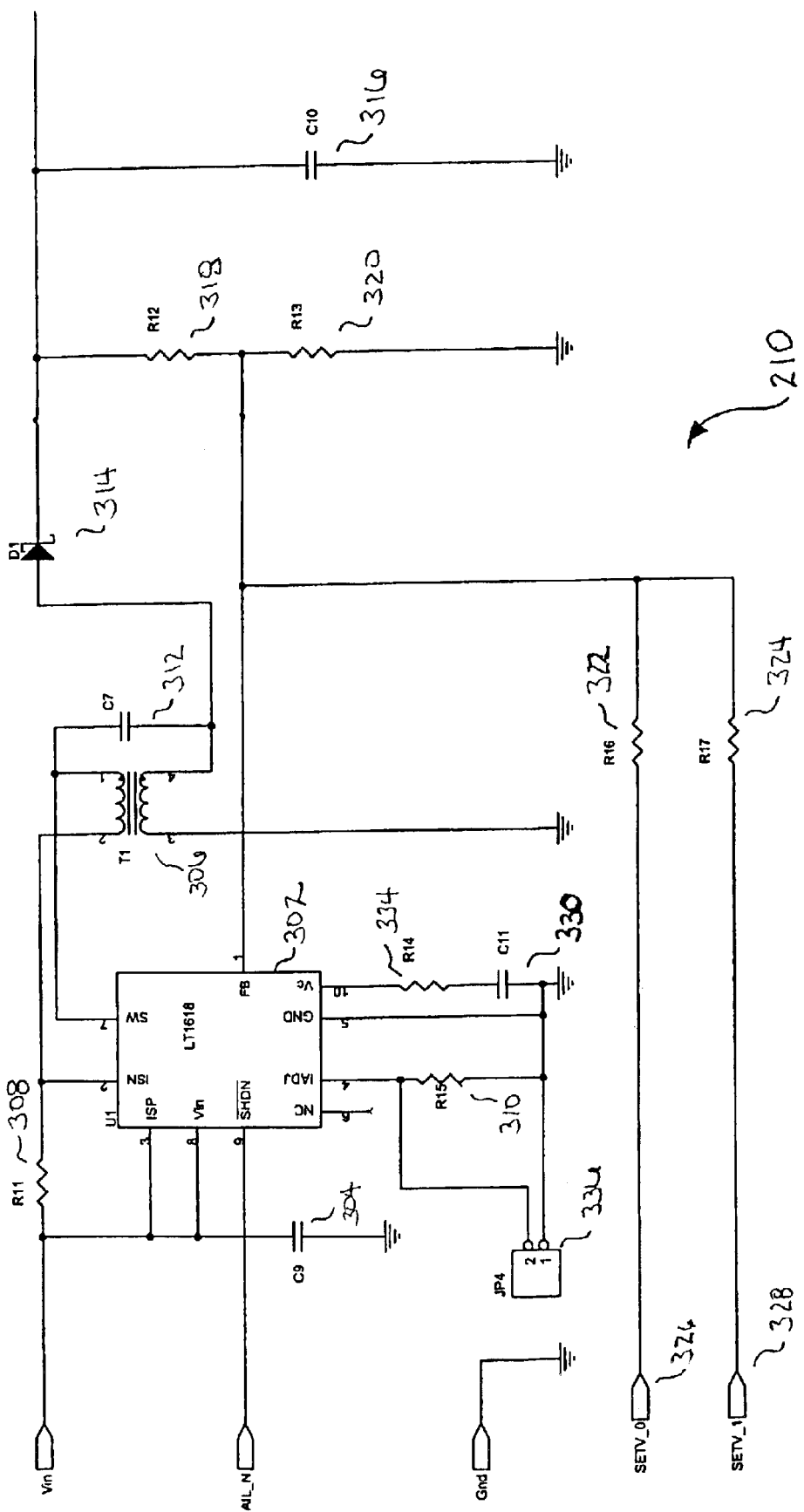
FIG. 3 is an exemplary detailed circuit diagram of an input power supply in an energy storage and power conditioning system for an application in an embodiment of the invention.

The input power supply 210, as shown in FIG. 3 in more detail, has the following characteristics: the current input to the regulator is limited so as to not exceed the capabilities of the primary power supply; an input to the power supply, PFAIL__N, shuts down the power supply in the event the primary power source ceases to supply power. This input may be supplied in various instances by the primary power supply, by reducing the primary power source (e.g., by a voltage divider or a transformer) and supplying the reduced voltage primary power source to an ADC with the output of the ADC connected to the PFAIL__N input, or a circuit may be supplied that monitors the state of the primary power source and is asserted in the event the primary power source is no longer available; a multi-bit input that changes the output voltage based on the binary value of the input. In this instance, it is a two-bit binary input that changes dependent upon ambient air temperature and with the output values changing according to the two-bit binary input, and; the output of the input power supply operates in a current limited mode until the UltraCap is charged to the voltage determined from monitoring the ambient air temperature. This output current is limited by controlling the input current.

In an exemplary embodiment of the input power supply 210 of the invention as shown in FIG. 3, the input power supply 210 is comprised of U1 302, which in this particular embodiment is a Linear Technology LT1618 step-up DC converter that functions as a power switch for a single-ended primary inductance converter ("SEPIC") type switching regulator. In this embodiment, capacitor C9 304 is an input filter capacitor that keeps any large circulating AC currents at the input power supply close to the power supply. In this particular embodiment, for example, capacitor C9 304 is rated 4.7 micro-Farad ("µF") and 25 V, though capacitors rated differently may be used. Transformer T1 306 serves as two coupled inductors of equal value. A torroidial inductor is used to minimize any stray magnetic fields. In this particular embodiment, for example, transformer T1 is comprised of paralleled 50 micro-Henry ("µH") torroidial inductors, though transformers of other ratings may be used. Resistors R11 308 and R15 310 are used to set the limit level for current control of the input current to the input power supply: the current limit is (0.050/R11), if R15 310 is 0 ohms. The current limit is (0.025/R11), if R15 310 is 2 mega-ohms. In this particular embodiment, R15 310 must be either 0 or 2 mega-ohms. R11 308 in this particular embodiment, for example, is 0.15 ohms at 5% accuracy, therefore the input current limit is 165 mA if R15 310 is 2 mega-ohms and the input current limit is 330 mA if R15 310 is 0 ohms. The use of a jumper, JP4 336, allows R15 310 to quickly and easily be changed from 0 to 2 mega-ohms, and vice-versa. Capacitor C7 312 couples the two windings of T1 306 together. Note that if C7 312 were omitted, the circuit would function as a conventional flyback converter. A flyback converter, however, would require a power-wasting snubber network to absorb the voltage kick from the leakage inductance of T1 306. Capacitor C7 312 causes leakage inductance energy to go to the load, transformer T1 306 must have a 1:1 ratio for this to work. In this particular embodiment, for example, capacitor C7 is rated 1 µF and 25 V. Diode D1 314 is an output rectifier. Because in this particular embodiment U1 302 operates above 1 MHz, D1 314 is a Schottky barrier rectifier. Capacitor C10 316 serves as an output filter. In this particular embodiment, for example, C10 316 is rated 4.7 µF and 25 V. Resistors R12 318 and R13 320 are feedback resistors for voltage sensing. In this particular embodiment, R12 318 is rated 100K ohms at 1% accuracy and R13 is rated 10K ohms at 1% accuracy. The R12 318 to R13 320 junction in this particular embodiment will be at 1.263 volts nominally when the voltage mode is controlling U1 302. Resistors R16 322 and R17 324 offset the output voltage by −1 volt and −2 volts, respectively, when the logic control signals SETV_0 326 and SETV_1 328 are set to a logical "1." In this particular embodiment R16 322 is 332K ohms and R17 324 is 165K ohms with a logic level "1" of 3.3 volts. If the logic level is other than 3.3 volts, new values for these resistors (322, 324) will need to be determined. Capacitor C11 330, and resistor R14 334 shape the frequency response of the input power supply to assure control loop stability. In this particular embodiment, C11 330 is rated 0.033 µF and 25 V, and R14 334 is rated 2K ohms at 5% accuracy.

Referring again to FIG. 2, the positive terminal 212 of the energy storage element 206 is also connected to the input of an output power supply 238. The output power supply 238, as shown in FIG. 4, has the following characteristics: the input voltage operating range should be set so that the upper limit is above the maximum voltage applied to the energy storage element and the lower limit should be set to the minimum usable voltage level of the storage element; the output voltage is set to a value appropriate for the particular application.

Figure 4:
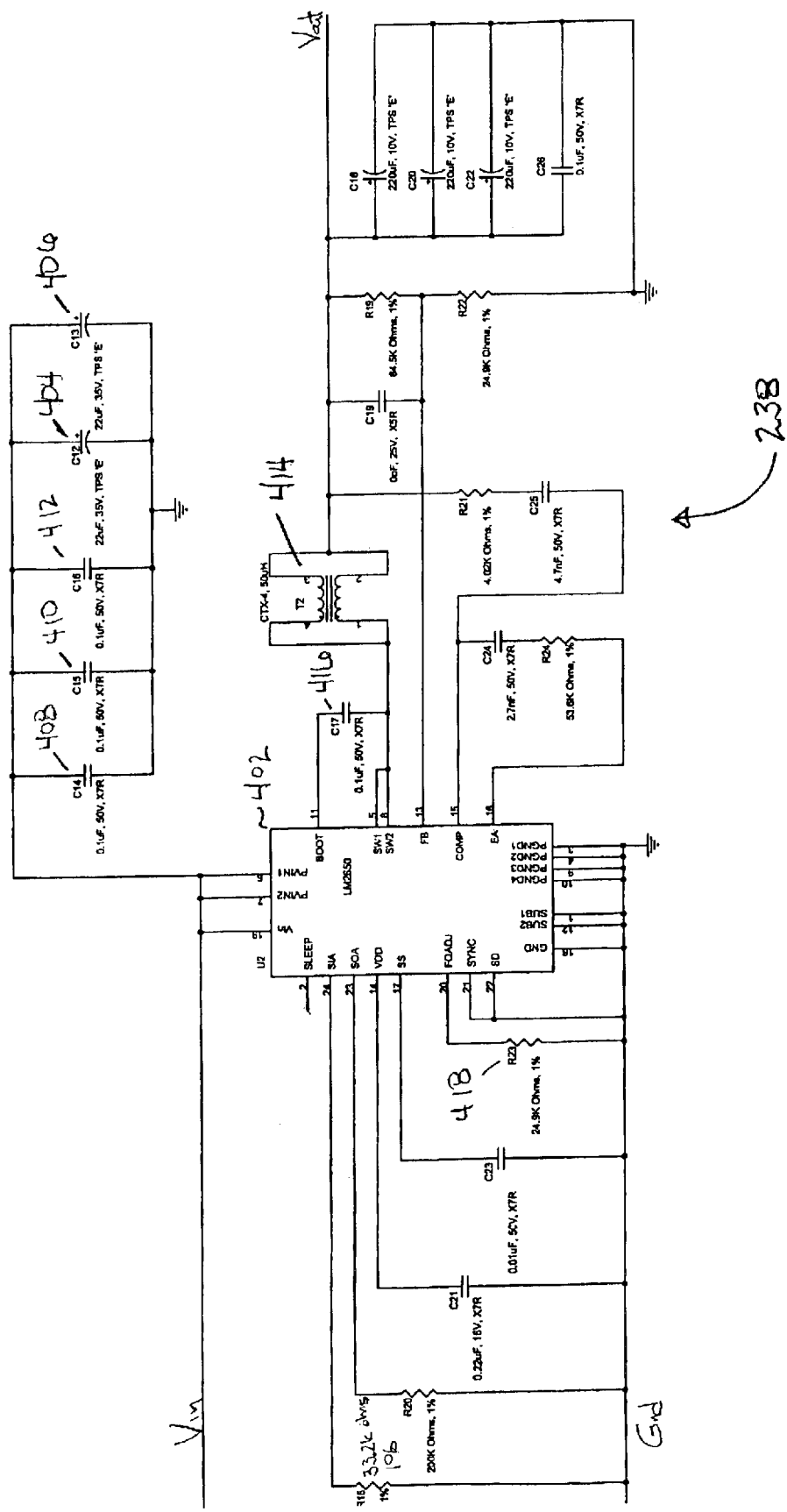
FIG. 4 is an exemplary detailed circuit diagram of an output power supply in an energy storage and power conditioning system for an application in an embodiment of the invention.

In an exemplary embodiment of the output power supply 238 of the invention as shown in FIG. 4, the output power supply 238 is comprised of U2 402, which in this particular embodiment is a National Semiconductor LM2650 buck-type switching regulator. Capacitors C12 404 and C13 406 are input filter capacitors designed to keep high frequency AC currents confined to areas near the chip 402. In this embodiment, capacitors C12 404 and C13 406 are each rated 22 µF and 35 V. These filtering capacitors 404, 406 are less effective at above about 2 or 3 MHz. Therefore, capacitors C14 408, C15 410, and C16 412 are used along with capacitors C12 404 and C13 406 to filter out higher-frequency AC currents, up to 20 MHz, or so. In this particular embodiment, capacitors C14 408, C15 410 and C16 412 are each rated 0.1 µF and 50 V. Device T2 414 is, in this particular embodiment, a 50 µH torroidial inductor. Paralleling two windings of the inductor 414 reduces the DC resistance of the winding. Paralleling two 50 µH coils on the same core results in 50 µH overall inductance. A torroidial coil was chosen in this embodiment for its low stray magnetic field. Capacitor C17 416 is part of a charge pump to allow proper gate drive and lower "ON" resistance of the pull-up MOSFET of the switching regulator 402 resulting in better efficiency. In this particular embodiment, capacitor C17 416 is rated 0.1 µF and 50 V. The resistor R23 418 sets the operating frequency, in this particular embodiment, to 200 KHz. This frequency was selected over the normal operating frequency of 90 KHz to reduce the inductor and capacitor physical sizes. In this particular embodiment, resistor R23 418 is rated 24.9K ohms at 1% accuracy.

The operation of the overall circuit as shown in FIG. 2 is controlled by one or more control processes running on a microcomputer, microprocessor or microcontroller (128), although a dedicated control circuit may be used (collectively, the "control system"). Control signals that are input into the control system include, for example, the voltage of the primary power source 234, V_MON 226, the voltage applied to the energy storage element 206, V_CAP 228, and the ambient air temperature as provided by a temperature sensor 130. Failure of the primary power source 234 results in shutdown of the input power supply 210 through the input control signal PFAIL_N 236. As previously described, this signal may originate from the primary power source 234 or the control system. When the input power supply 210 shuts down, it no longer provides energy to the energy storage unit 206 or the output power supply 238. Furthermore, energy from the energy storage unit 203 is prevented from feeding back into the primary power source 234 by the high impedance of the input power supply 210.

Figure 5:
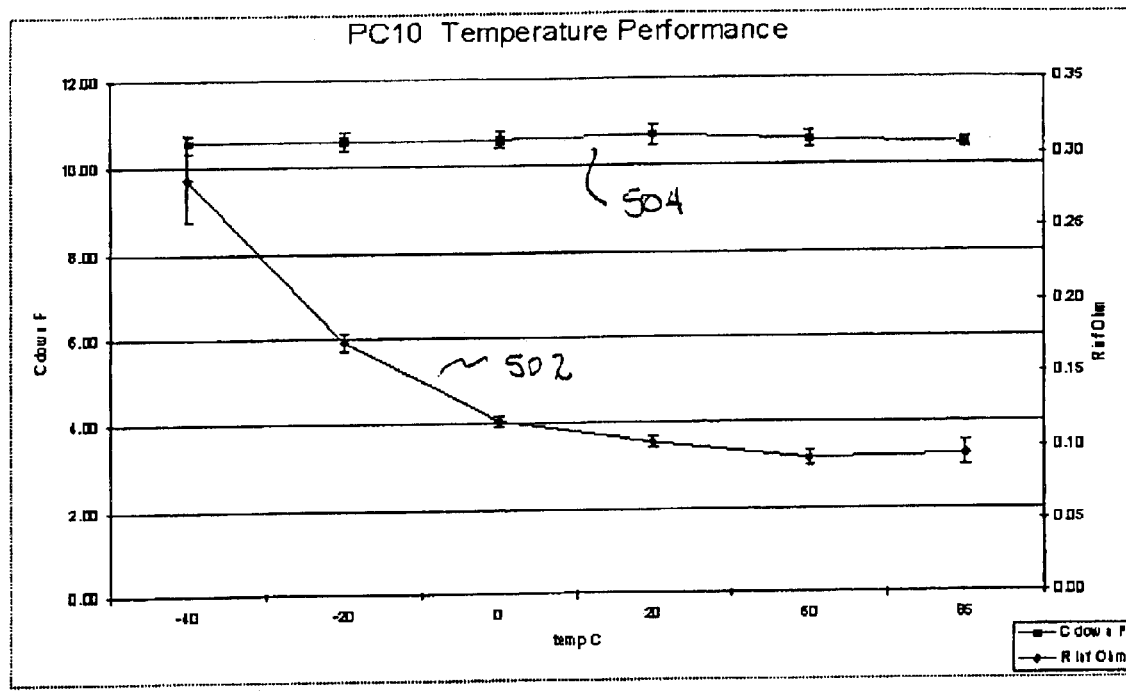
FIG. 5 is a graphical illustration of the change in equivalent series resistance of a Maxwell PC10 UltraCap over a change in temperature as such capacitors may be used in an embodiment of the invention.

The control system algorithms control the input power supply 210 such that Vout 208 is lower at higher temperatures to prevent damaging the UltraCaps 204 and Vout 208 is higher at low temperatures to compensate for internal energy dissipation within the capacitors 204 caused by higher ESR. As can be seen in FIG. 5, in a particular embodiment using UltraCaps 204 such as, for example, Maxwell PC10 capacitors, the ESR 502 varies greatly over temperature and in this instance ranges from approximately 0.28 ohms at −40 C to 0.10 ohms at 85 C, while the capacitance 504 remains relatively the same over the temperature range. The voltage output 208 of the input power supply 210 is adjusted for temperature through the use of the two control signals that are outputs from the control system, SETV_0 230, and SETV_1 232. At lower temperatures the higher voltages do not damage the UltraCaps 204 and in no case does the applied voltage exceed the manufacturer's ratings for the UltraCap 204. In an exemplary preferred embodiment of the invention utilizing six Maxwell PC10 UltraCaps connected in series as the energy storage unit 206, these control signals 230, 232 are set as shown in Table 1 (and in FIG. 2) for temperature compensation of the output voltage, Vout 208, of the input power supply 210.

TABLE 1

| Temp Range | Vout | SETV_1 | SETV_0 |
|---|---|---|---|
| −40 C. to −20 C. | 15 V | 0 | 0 |
| −20 C. to 0 C. | 14 V | 0 | 1 |
| +0 C. to 30 C. | 13 V | 1 | 0 |
| 30 C. to 85 C. | 12 V | 1 | 1 |

An exemplary algorithm in pseudo-code for controlling the energy storage/energy supply device 106 in an embodiment of the invention is attached hereto as APPENDIX A and is completely incorporated herein. The pseudo code is provided in a format of pseudo "C" programming language. The algorithm generally performs the functions as described in the flowcharts of FIG. 6 and FIG. 11.

Figure 6:
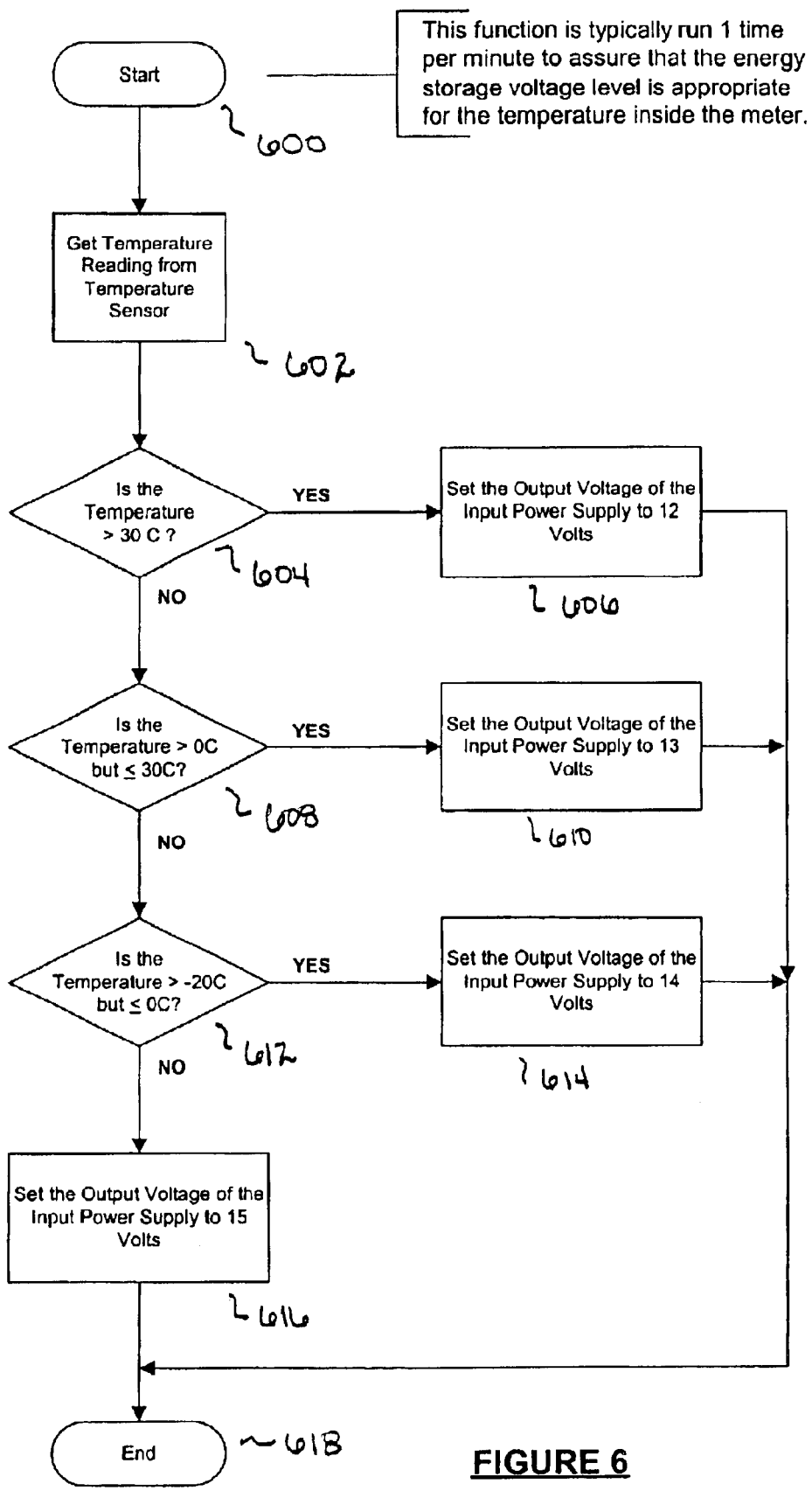
FIG. 6 is a flowchart illustrating the steps of a control algorithm for controlling the output voltage of an input power supply for charging and supplying energy to an energy storage unit and output power supply in an embodiment of the invention.

FIG. 6 is a flowchart illustrating the steps of a control process for controlling the output voltage, Vout 208, of an input power supply 210 for charging and supplying energy to an energy storage unit 206 and output power supply 238 in an embodiment of the invention. This process is executed on the control system and generally executes approximately once each minute to obtain the ambient air temperature and accordingly adjust the output voltage 208 of the input power supply 210 dependent upon the measured ambient air temperature. Table 1 provides the output voltages 208 for the given ambient air temperature in an exemplary embodiment of the invention.

The control process begins in Step 600. In Step 602, the ambient air temperature is measured by a temperature sensor and converted into a signal that is provided to the control system in order to determine the ambient air temperature. This measured ambient air temperature is compared to one or more predetermined temperature values in Steps 604, 608 and 612 in order to adjust the output voltage 208 of the input power supply 210 according to the measured ambient air temperature. In this particular embodiment, if the ambient air temperature is above 30 C, then the output voltage 208 is set at 12 volts (Step 606) and the process ends (Step 618); if the ambient air temperature is greater than 0 C, but less than or equal to 30 C, then the output voltage 208 is set at 13 volts (Step 610) and the process ends (Step 618); and, if the ambient air temperature is greater than −20 C, but less than or equal to 0 C, then the output voltage 208 is set at 14 volts (Step 614) and the process ends (Step 618). If the determination of Steps 604, 608 or 612 are negative, then the control process proceeds to Step 616. In Step 616, if the ambient air temperature is less than or equal to −20 C, then the output voltage 208 is set at 15 volts (Step 610) and the process ends (Step 618).

SPECIFIC EXAMPLE

As stated above, a specific embodiment of the invention has an energy storage element 206 comprised of six UltraCaps 204 connected in series. In this particular embodiment, design considerations for the invention include an expected life of at least 10 years with minimal failures, an average operating temperature of 55 C, a high temperature design limit of 85 C, and a low temperature design limit of −40 C.

Figure 7:
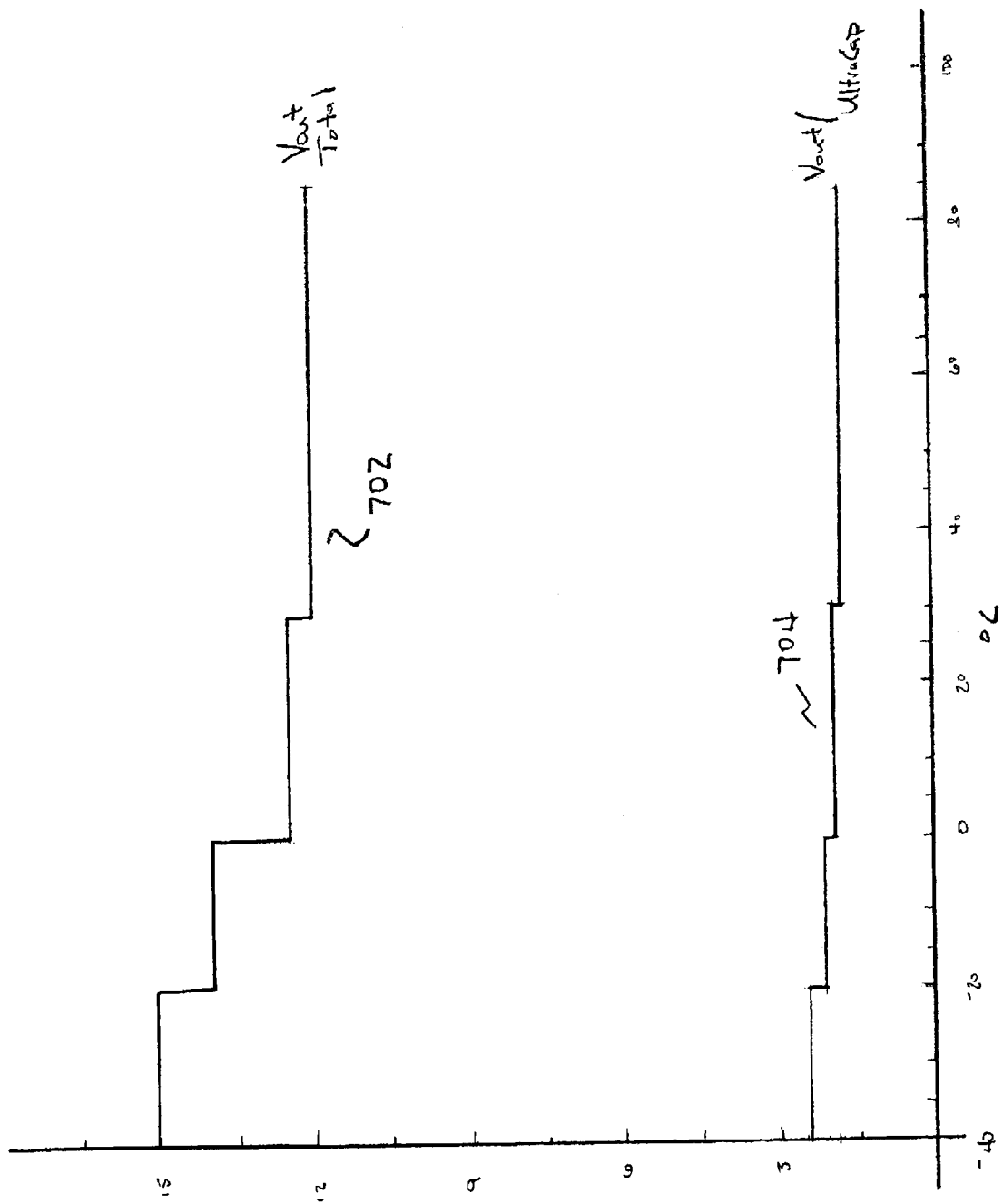
FIG. 7 is a graphical illustration of the total charging voltage applied to an energy storage element comprised of six UltraCaps connected in series and the charging voltage applied to each UltraCap over a range of temperatures in an embodiment of the invention.

As shown above in Table 1, the voltage applied to the energy storage unit 206 during charging (i.e., while the primary power source 234 is providing power to the input power supply 210) is regulated by the input power supply 210 according to the ambient temperature so as to minimize voltage-temperature stress on the UltraCaps 204. As shown in FIG. 7, the total output voltage 702, Vout, applied to all the UltraCaps 202 in the six series connected UltraCaps 202 in this embodiment by the input power supply 210 varies according to temperature. Likewise, the voltage 704 applied to each individual UltraCap varies according to the temperature. As FIG. 7 shows, the voltage applied to each UltraCap 204 in an embodiment of the energy storage unit 206 comprised of six UltraCaps 204 connected in series is 2.5 volts per UltraCap for a total Vout 208 of 15 volts when the ambient temperature is between −40 and −20 C; between −20 and 0 C, 2.33 volts are applied to each UltraCap 204 for a total Vout 208 of 14 volts; between 0 and 30 C, 2.16 volts are applied to each UltraCap 204 for a total Vout 208 of 13 volts, and; between 30 and 85 C, 2.00 volts are applied to each UltraCap 204 for a total Vout 208 of 12 volts. In this embodiment, resistors R5–R10 202, as shown in FIG. 2 are 10K ohm at 1% accuracy to encourage voltage equivalency across the series-connected UltraCaps.

Figure 8:
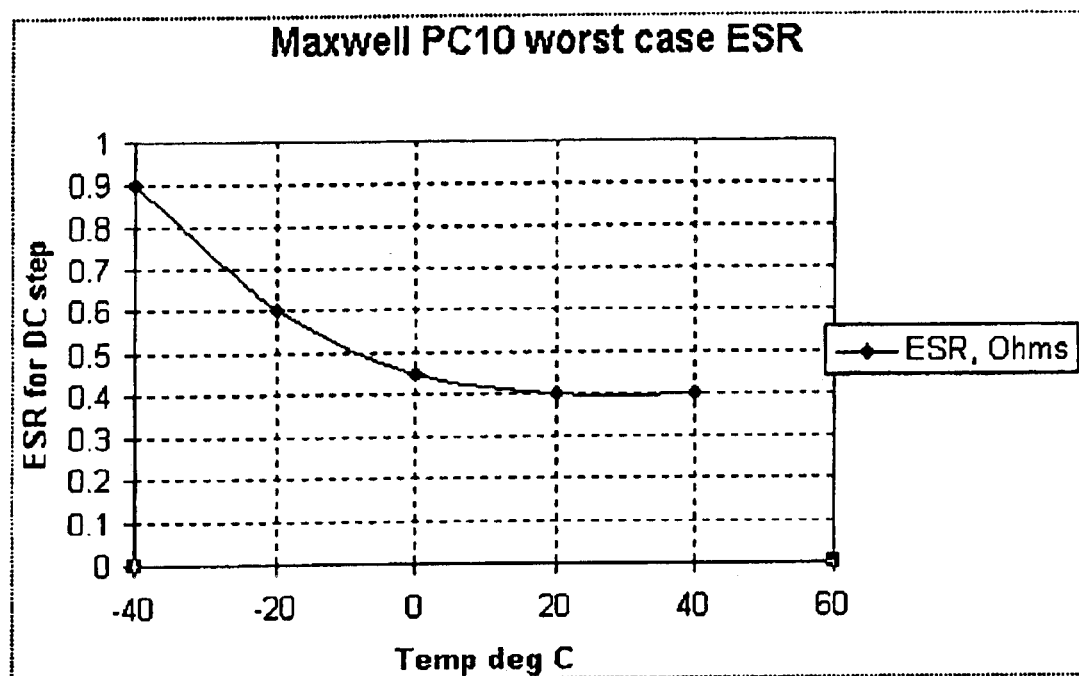
FIG. 8 is a graphical illustration of the worst-case ESR over a range of temperatures that can be expected for a Maxwell PC10 UltraCap after ten years use in an embodiment of the invention.

In order to compensate for possible degradation over the life of the UltraCap, FIG. 8 shows the worst-case direct-current ESR that can be expected for each UltraCap after 10 years of service, depending upon temperature. This worst-case ESR is used for the design calculations of this embodiment.

Figure 9:
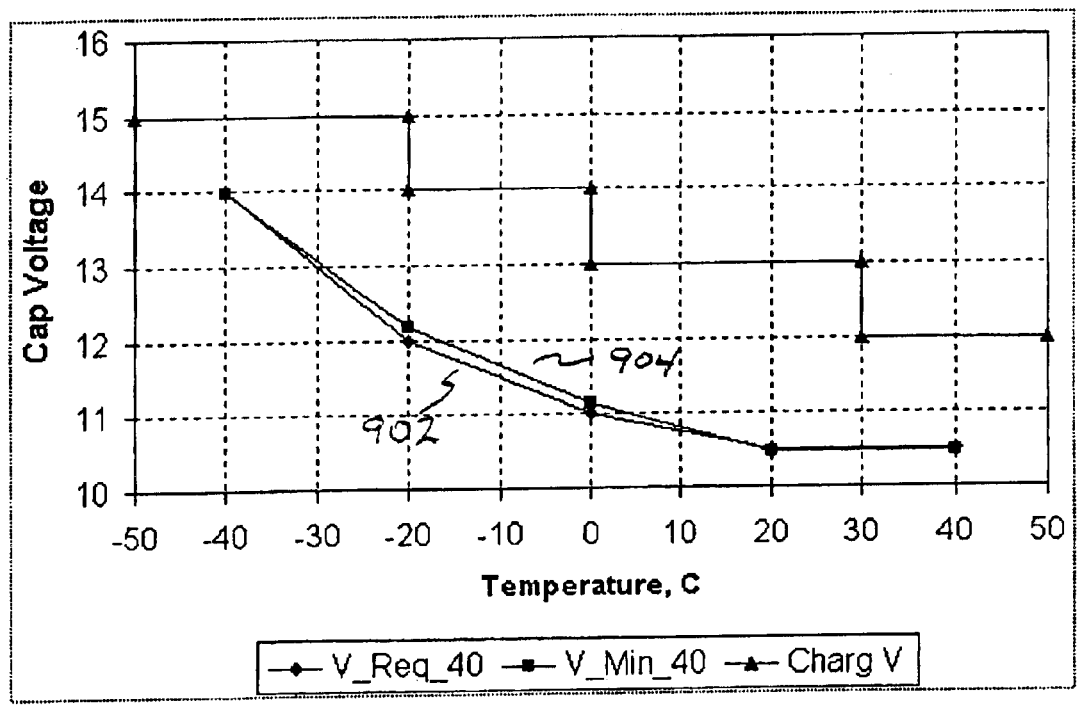
FIG. 9 is a graphical illustration of the required and minimum voltage that the energy storage element UltraCaps must be charged before a 40-byte message may be transmitted in an embodiment of the invention.
Figure 10:
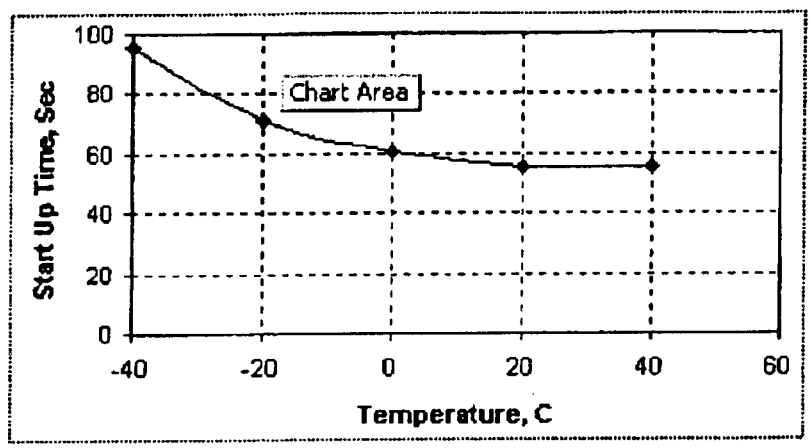
FIG. 10 is a graphical illustration of the amount of time required to charge a fully discharged energy storage element comprised of six Maxwell PC10 UltraCaps to a voltage sufficient to send a 256-byte message over a range of temperatures in an embodiment of the invention.

The worst-case design scenario involves the need to provide enough energy to transmit a message via the telemetry device 104 after the failure of the primary power source 110 when the UltraCaps 204 are at the end of their serviceable life (approximately 10 years of use). Generally, it is assumed that the message to be transmitted during this power outage is 40-bytes in length. The required and minimum energy storage voltage to send a 40-byte message is also temperature dependent and is shown in FIG. 9. Furthermore, upon initial start-up, or if the energy storage/supply device 106 has been without power for some time, then the UltraCaps 202 will likely have discharged and require a charge period before a message may be transmitted. This charge-up time is temperature-dependent as well and is shown in FIG. 10. Note that this time shown in FIG. 10 is conservative in nature in that it is based on the charge needed to transmit a 256-byte message.

Assuming an application for metering the use or flow of electricity, the metering device 102 may be, for example, a Smart Meter™ as manufactured by Elster (formerly known as Asea Brown Boveri or ABB), and the telemetry device may be a Creatalink2 XT™, a ReFlex™ pager radio as manufactured by SmartSynch, Inc., both commercially available products. When the primary power source 110 to the energy storage/supply device 106 is "on," the sending of data depends upon the power management by the microprocessor 128 and associated software in the Smart Meter™ module. Before sending a message, the microprocessor evaluates the temperature via a temperature sensor 130, charge voltage 228, and size of the message to be sent to determine if adequate energy is available. If the conditions are not met then the message is deferred until later. If a large block of data has just very recently been sent, then the transmitting of the next message may be deferred for up to 40 seconds. If the primary power source 110 has just been restored after an extended outage, then a delay of almost two minutes may occur before the message may be sent (reference FIG. 10). The software running on the control system will periodically check the charge voltage 228 via an analog to digital converter in the ReFlex™ pager radio. This process is further detailed in the flowchart of FIG. 11, as described below.

Figure 11A:
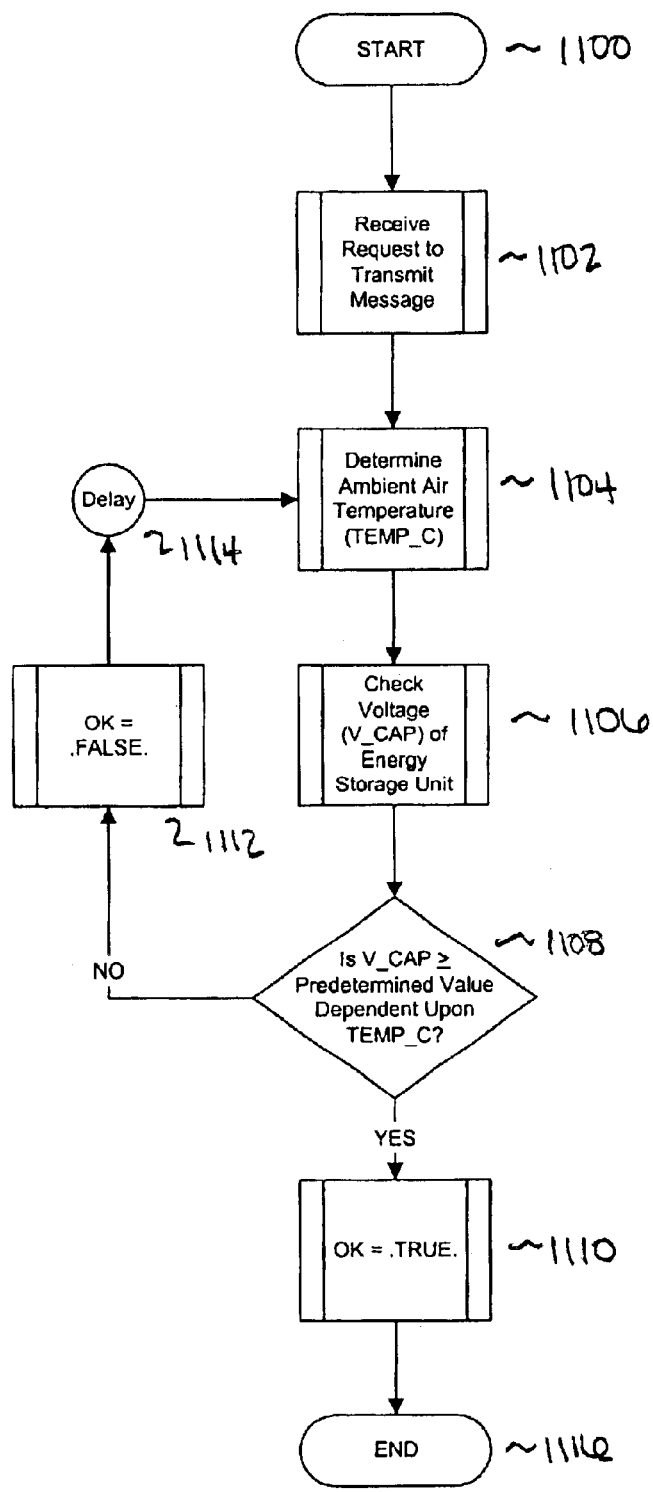
FIG. 11A is an overview flowchart illustrating the steps of a control process for determining the available energy of an energy storage unit to supply energy to a telemetry device for transmitting a message in an embodiment of the invention.
Figure 11B:
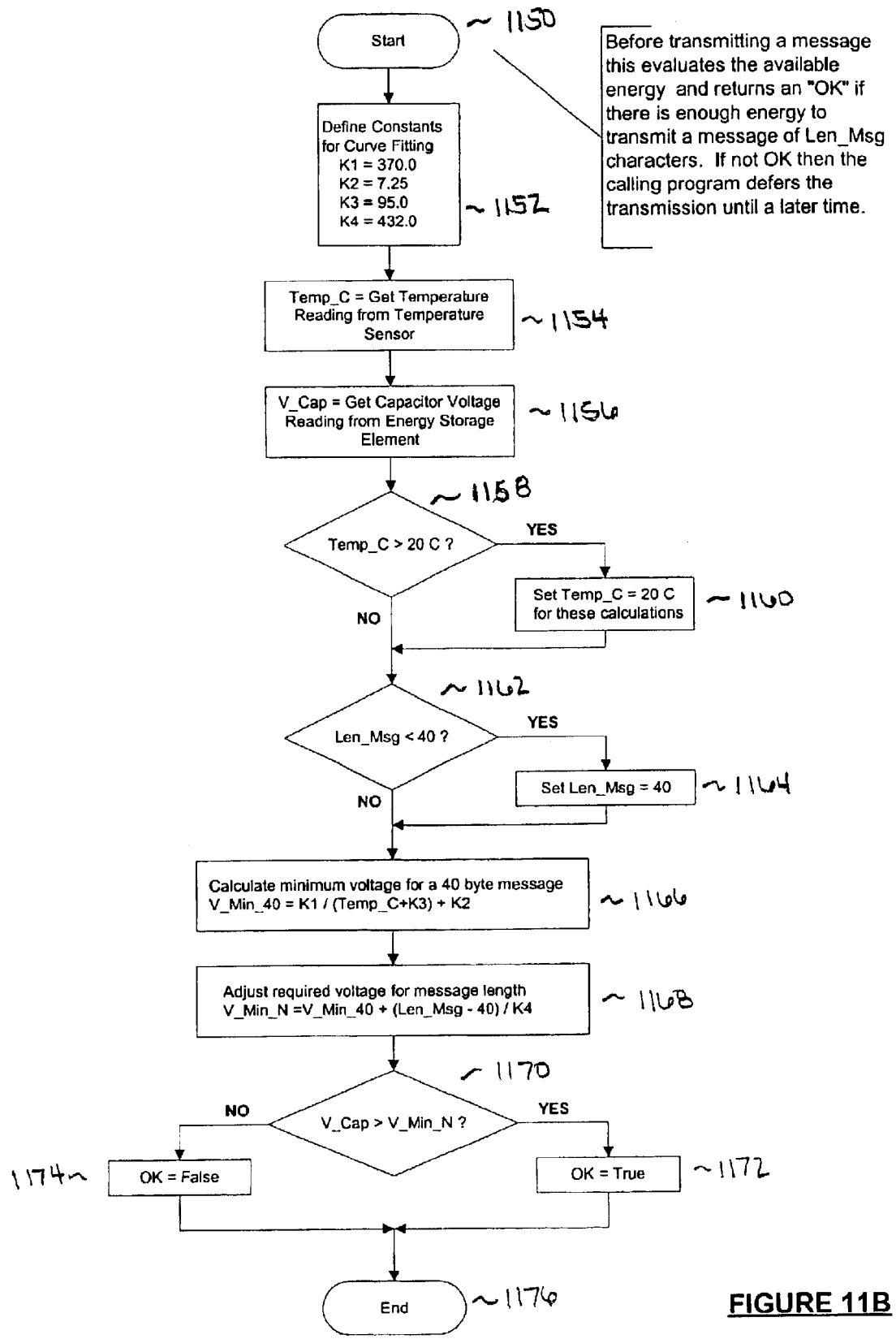
FIG. 11B is a more detailed flowchart illustrating the steps of a control process for determining the available energy of an energy storage unit to supply energy to a telemetry device for transmitting a message in an embodiment of the invention.

FIGS. 11A and 11B are flowcharts illustrating the steps of a control process for determining the available energy of an energy storage unit 206 to supply energy to a telemetry device 104 for transmitting a message in an embodiment of the invention. When transmitting a message, energy is supplied to the telemetry device 104 not only by the input power supply 210, but also by the energy storage unit 206. As described above, the energy storage unit 206 must be charged to a certain predetermined voltage where such predetermined value is dependent upon ambient air temperature in order to supply sufficient energy such that the telemetry device 104 is able to transmit a message. The algorithm described in FIGS. 1A and 1B returns a Boolean value of "OK." If the energy storage unit 206 has sufficient energy to transmit the message, then OK is "true." If the energy storage unit does not have sufficient energy to transmit the message, then OK is "false" and the control system waits a predetermined period of time and re-executes the algorithm to determine if the energy storage device 206 is charged to an adequate voltage. FIG 11A is a general overview of the control process for determining if the energy storage unit 206 is sufficiently charge to transmit a message, depending upon the ambient temperature. The process begins at Step 1100. In Step 1102, the controller receives a request from the telemetry device to transmit a message. In Step 1104, the controller determines the ambient air temperature. Depending upon the ambient air temperature, in Step 1106 the controller then checks the voltage of the energy storage unit 206 to determine if it is at or above a minimum voltage level that is established by the ambient air temperature. If the minimum voltage level of the energy storage unit 206 is met (Step 1108) then "OK" is set as "true" (Step 1110) and the process ends (Step 1116). If the minimum voltage level of the energy storage unit 206 is not met (Step 1108) then "OK" is set as "false" (Step 1112), the process delays (Step 1114) for a predetermined period of time, and the process ends goes to Step 1104 to check the ambient air temperature and begin again.

FIG. 11B is a more specific embodiment of the process described in FIG. 11A. The process begins at Step 1150. In Step 1152, constants K1, K2, K3, and K4 are set for curve fitting within the algorithm. In Step 1154, "TEMP__C" is set as the ambient air temperature obtained from the temperature sensor. In Step 1156, "V__CAP" is set as the voltage obtained from the energy storage unit. In Step 1158, it is determined whether TEMP__C is greater than 20 C. If TEMP C is greater than 20 C, TEMP__C is set equal to 20 C for the purposes of these calculations (Step 1160) and the process proceeds on to Step 1162; if TEMP__C is less than or equal to 20 C, then the process also proceeds to Step 1162. In Step 1162, it is determined whether the length of the message to be transmitted ("LEN__MSG") is less than 40 bytes. If LEN__MSG is less than 40 bytes, then in Step 1164 LEN__MSG is set equivalent to 40 bytes for the purpose of these calculations and the process proceeds on to Step 1166. If LEN__MSG is equal to or greater than 40 bytes, then the process proceeds on to Step 1166. In Step 1166, the minimum voltage required to transmit a 40-byte message ("V__MIN__40"), is calculated according to the formula:

$$V\_MIN\_40 = K1/(TEMP\_C + K3) + K2.$$

The required voltage ("V__MIN__N") for a LEN__MSG greater than 40 bytes is determined in Step 1168 by the formula:

$$V\_MIN\_N = V\_MIN\_40 + (LEN\_MSG + 40)/K4.$$

In Step 1170, it is determined whether V__CAP is greater than V__MIN__N. If it is, Step 1172, then OK is set as "true."
If V__CAP is less than or equal to V__MIN__N, Step 1174, then OK is set as "false" and the process ends (Step 1176).

Referring back to FIG. 9, the V__Req_40 curve 902 represents the required voltage charge for the energy storage unit 206 for sending a 40-byte message, depending upon temperature. The $V_{\_Min}$ 40 curve 904 is the calculated minimum voltage charge for the energy storage element 206 for sending a 40-byte message from the formula used by the microprocessor in the Smart Meter TM (reference FIGS. 11A and 11B). The design criteria involves a transmit time of 292 milliseconds to send a 40 byte message (based on three tries for success), and; 1069 milliseconds to send a 256 byte message, also based on three tries for success. Assuming an ESR of 0.6 ohms per UltraCap 202 (worst case at −20 C), and 12 volts initial charge for all the UltraCaps 202 connected in series, the energy storage unit 206 reaches a minimum usable voltage of approximately 7 volts in 400 milliseconds, well in excess of the required 292 milliseconds to send a 40-byte message.

When the primary power source 110 is "off," the sending of a power fail report with the power available also depends on power management by the microprocessor 128 in the Smart Meter TM module. The sending of the power fail report must be accomplished with the energy available in the energy storage element 206. A critical issue in power fail reporting is the maximum amount of time that the telemetry device 104 may operate in the receive mode, while still retaining enough energy to transmit the power fail report. Good design practice calls for the power fail reporting software to attempt to send the power fail report even if the voltage is too low considering the ambient temperature and the message size. It is important that the telemetry device 104 be able to report a power failure to a parent utility so that the utility may investigate the outage and use such information for trouble determination and repair.

Table 2 shows the amount of time that the telemetry device 104 may be in receive mode before attempting to send a power fail report at various temperatures under worst case circumstances in this particular embodiment of the invention. Receive time is an important design criteria for sending a power fail report because the energy storage unit 206 must supply enough energy to the telemetry device 104 to complete receiving any incoming message an then have enough energy to transmit the power fail report. It is assumed that 200 milliseconds are required to transmit a 40-byte power failure message and that two tries are required for sending of the message. Other worst case assumptions include: assuming the UltraCaps 202 have been in use for 10 years and that their ESR has doubled from its initial values; the telemetry device 104 requires 1.4 amps at 5.5 volts to transmit; the output power supply 238 is 85% efficient and that the output power supply 238 will cease operating when its input voltage 228 is approximately 7.0 volts.

TABLE 2

Worst-Case Scenario

| Ambient Temperature | Initial Volts | ESR Ohms | Tx Minimum Volts | Receive Time Seconds |
| --- | --- | --- | --- | --- |
| −40 C. | 15 | 0.90 | 14.15 | 48 |
| −30 C. | 15 | 0.75 | 13.00 | 121 |
| −21 C. | 15 | 0.60 | 11.90 | 184 |
| −20 C. | 14 | 0.60 | 11.90 | 119 |
| −10 C. | 14 | 0.53 | 11.30 | 151 |
| −1 C. | 14 | 0.45 | 10.70 | 181 |
| 0 | 13 | 0.45 | 10.70 | 120 |
| 29 C. | 13 | 0.40 | 10.30 | 140 |
| 30 C. | 12 | 0.40 | 10.30 | 83 |
| 80 C. | 12 | 0.40 | 10.30 | 83 |

"Initial Volts" is the charge on the energy storage element 206 at the time of the power failure. "ESR Ohms" is the equivalent series resistance of each UltraCap 202 that comprises the energy storage element 206, "Tx Minimum Volts" is the minimum voltage that will be required at the input 228 to the output power supply 238 in order to transmit the power fail message (at the given ambient temperature), and "Receive Time Seconds" is the amount of time that the telemetry device 104 may be in receive mode before sending the power fail message and with the energy storage element 206 retaining enough energy to transmit the power fail message. Note that the above values are dependent upon the devices used that comprise the energy storage/energy supply device 106 as well as the telemetry 104 and metering devices 102 and that the values above are only valid for this particular embodiment.

Figure 12:
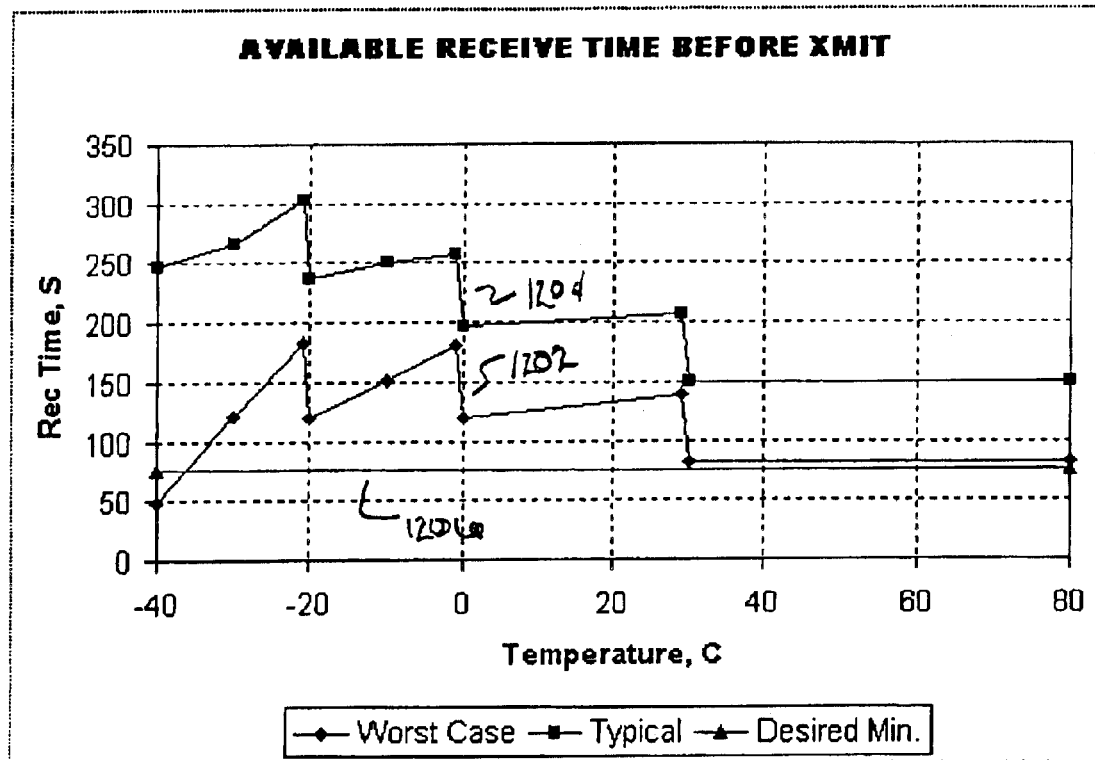
FIG. 12 is a graphical illustration of the worst-case and typical amount of time that the telemetry device may operate in the "receive" mode during a power failure and still have sufficient energy to transmit a 40-byte power fail message over a range of temperatures in an embodiment of the invention.

If the telemetry device 104 has just begun to receive a message at the time of the failure of the primary power source 234, in this embodiment it may continue to receive such a message for be up to 76 seconds before the telemetry device 104 may transmit the power fail report. Therefore, the desired minimum Receive Time Seconds (for design purposes) is 76 seconds in this embodiment. Referring to Table 2 and FIG. 12, it can be seen that this minimum design criteria 1206 is met at all the evaluated temperatures other than at −40 C in this worst-case scenario 1202. It is thought that the actual ESR of a 10-year-old UltraCap 202 will not approach the conservative values shown in Table 2 and thus the 76 second receive time requirement will not likely be violate at the −40 C ambient.

Table 3 shows the amount of time that the telemetry device 104 may be in receive mode before attempting to send a power fail report at various temperatures under typical operating circumstances in this particular embodiment of the invention. As above, it is assumed that 200 milliseconds are required to transmit a 40-byte power failure message and that two tries are required for sending of the message. Other assumptions include: a typical ESR value for each UltraCap 202; the telemetry device 104 requires 1.4 amps at 5.5 volts to transmit; the output power supply 238 is 85% efficient and that the output power supply 238 will cease operating when its input voltage 228 is approximately 7.0 volts.

TABLE 3

Typical Scenario

| Ambient Temperature | Initial Volts | ESR Ohms | Tx Minimum Volts | Receive Time Seconds |
| --- | --- | --- | --- | --- |
| −40 C. | 15 | 0.45 | 10.70 | 247 |
| −30 C. | 15 | 0.38 | 10.15 | 268 |
| −21 C. | 15 | 0.30 | 9.55 | 304 |
| −20 C. | 14 | 0.30 | 9.55 | 237 |
| −10 C. | 14 | 0.27 | 9.30 | 250 |
| −1 C. | 14 | 0.23 | 9.05 | 258 |
| 0 | 13 | 0.23 | 9.05 | 197 |
| 29 C. | 13 | 0.20 | 8.80 | 207 |
| 30 C. | 12 | 0.20 | 8.80 | 150 |
| 80 C. | 12 | 0.20 | 8.80 | 150 |

Note that the above values are also dependent upon the devises used that comprise the energy storage/energy supply device 106 as well as the telemetry 104 and metering devices 102 and that the values above are only valid for this particular embodiment.

The desired minimum Receive Time Seconds (for design purposes) is also 76 seconds in this embodiment. Referring to Table 3 and FIG. 12, it can be seen that this minimum design criteria 1206 is met at all the evaluated temperatures in this typical scenario 1204.

Therefore, it can be seen that systems and methods are disclosed for storing and supplying energy in land-based telemetry applications. In particular, the present invention utilizes a form of capacitor known as UltraCaps as an energy storage element in concert with an input power supply and an output power supply to provide energy to a telemetry device that receives its information from a metering device. The present invention is designed for a minimum life of 10 years, is compact in size, has sufficient energy storage capabilities for the application, and has the ability to operate over a wide temperature range.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system connected to a primary source of energy for supplying energy to a land-based telemetry device, comprising:
   an input power supply;
   a secondary source of energy;
   an output power supply; and
   a control system,
   wherein the primary source of energy supplies energy to the input power supply, the input power supply charges the secondary source of energy and provides energy to the output power supply, the secondary source of energy supplies energy to the output power supply, the output power supply supplies energy to the land-based telemetry device and the control system provides one or more signals to control the input power supply such that an output voltage from the input power supply is adjusted according to the ambient temperature.

2. The system of claim 1, wherein the output voltage from the input power supply is relatively lower at comparatively high ambient temperatures and the output voltage from the input power supply is relatively higher at comparatively low ambient temperatures.

3. The system of claim 2, wherein the secondary source of energy supplies all the energy to the output power supply in the event of removal of the primary source of energy.

4. The system of claim 3, wherein the secondary source of energy supplies sufficient energy for the land-based telemetry device to transmit a power fail message in the event of removal of the primary source of energy.

5. The system of claim 4, wherein the secondary source of energy is comprised of one or more capacitors with each capacitor having a relatively high capacitance value and a relatively low equivalent series resistance value.

6. The system of claim 5, wherein the secondary source of energy is comprised of six capacitors connected in series.

7. The system of claim 6, wherein the output voltage from the input power supply is 12 volts at ambient temperatures above 30 C, 13 volts at ambient temperatures between 0 C and 29 C, 14 volts at ambient temperatures between −20 C and −1 C, and 15 volts for ambient temperatures less than −20 C.

8. A power supply system connect to a primary source of energy for extending the operational life of an energy storage device, comprised of:
   an input power supply having an adjustable output voltage; and
   a control system,
   the primary source of energy supplying energy to the input power supply, the input power supply supplying energy to the energy storage device and the control system adjusting the output voltage of the input power supply according to the ambient temperature.

9. The system of claim 8, wherein the energy storage device is comprised of one or more capacitors with each capacitor having a relatively high capacitance value and a relatively low equivalent series resistance value.

10. The system of claim 9, wherein the energy storage device is comprised of six capacitors connected in series.

11. The system of claim 10, wherein the output voltage from the input power supply is 12 volts at ambient temperatures above 30 C, 13 volts at ambient temperatures between 0 C and 29 C, 14 volts at ambient temperatures between −20 C and −1 C, and 15 volts for ambient temperatures less than −20 C.

12. An apparatus connected to a primary source of energy and supplying electric power to a wireless telemetry device, the apparatus also connected to a controller that senses ambient temperature and generates a control signal based thereon, the controller further generating a power fail signal in the event of a failure of the primary power supply, the apparatus comprising:

an input power supply connected to receive electric power from the primary source of energy, the input power supply also receiving the control signal from the controller and using the received electric power to generate an output voltage having a level depending upon the control signal, the input power supply further receiving the power fail signal;

a secondary source of energy connected to receive the output voltage from the input power supply, the secondary source of energy having at least one capacitor for storage of secondary energy with said capacitor having an equivalent series resistance (ESR); and an output power supply connected to receive energy from an output of the input power supply, and supplying energy to a wireless telemetry device based thereon, the input power supply adjusting its output voltage based on the control signal so that its output voltage decreases with increasing temperature, and conversely increases with decreasing temperature to adjust for change in the ESR of the capacitor in the secondary source of energy with change in temperature, and in the event of a failure in the primary source of energy, the controller activating the control signal causing the input power supply to shut down by entering a high impedance state, and the output power supply receives electric power from the capacitor of the second source of energy.

13. An apparatus for providing electric power to a wireless telemetry device, the apparatus comprising:

a temperature sensor sensing ambient temperature and generating a temperature signal based thereon;

a primary source of energy generating primary electric power;

a controller connected to the temperature sensor to receive the temperature signal, and generating a control signal based thereon, the controller also connected to the primary source of energy and generating a power fail signal based on a level of the electric power generated by the primary source of energy;

an energy storage and supply device including
an input power supply connected to receive the control signal and the primary electric power, and generating an output voltage with a level dependent upon the control signal;

a secondary source of energy including at least one capacitor with an equivalent series resistance (ESR), said capacitor connected to receive the output voltage from the input power supply; and an output power supply connected to receive the output voltage from the input power supply in normal operation, and to receive output voltage from the secondary source of energy in the event of a failure in the primary source of energy, and supplying output voltage to the wireless telemetry device based on the output voltage received from the input power supply, the controller generating the control signal so as to adjust the input power supply to decrease its output voltage with increasing temperature, and conversely, to decrease the output voltage of the input power supply with decreasing temperature to accommodate change in the ESR of the capacitor.

14. A method of supplying energy to a land-based telemetry device comprising:

supplying a primary source of energy to an input power supply, the input power supply providing energy to an energy storage device and an output power supply and the output power supply providing energy to the land-based telemetry device;

supplying energy to the output power supply from the energy storage device when the output power supply requires more energy than can be supplied by the input power supply;

monitoring ambient air temperature with a temperature sensor;

monitoring output voltage of the input power supply; and adjusting the output voltage of the input power supply according to the ambient air temperature.

15. The method of claim 14, wherein the output voltage of the input power supply is relatively low when the ambient air temperature is comparatively high and the output voltage of the input power supply is relatively high when the ambient air temperature is comparatively low.

16. The method of claim 14, further comprising the steps of:

monitoring the voltage of the primary source of energy supplied to the input power supply; and supplying all the energy to the output power supply from the energy storage device when the primary source of energy is removed.

17. A method of extending the life of an energy storage system comprising the steps of:

supplying a primary source of energy to an input power supply, the input power supply providing energy to an energy storage device;

monitoring ambient air temperature with a temperature sensor;

monitoring output voltage of the input power supply; and adjusting the output voltage of the input power supply according to the ambient air temperature.

18. The method of claim 17, wherein the output voltage of the input power supply is relatively lower when the ambient air temperature is comparatively high and the output voltage of the input power supply is relatively high when the ambient air temperature is comparatively low.

* * * * *